C. H. HALL

ASH REMOVING DEVICE

March 24, 1931.

Re. 18,006

2 Sheets-Sheet 1

Original Filed July 9, 1925

Cortice H. Hall

INVENTOR.

BY Merrell & Clay

ATTORNEYS.

C. H. HALL
March 24, 1931.
ASH REMOVING DEVICE
Re. 18,006
Original Filed July 9, 1925
2 Sheets-Sheet 2
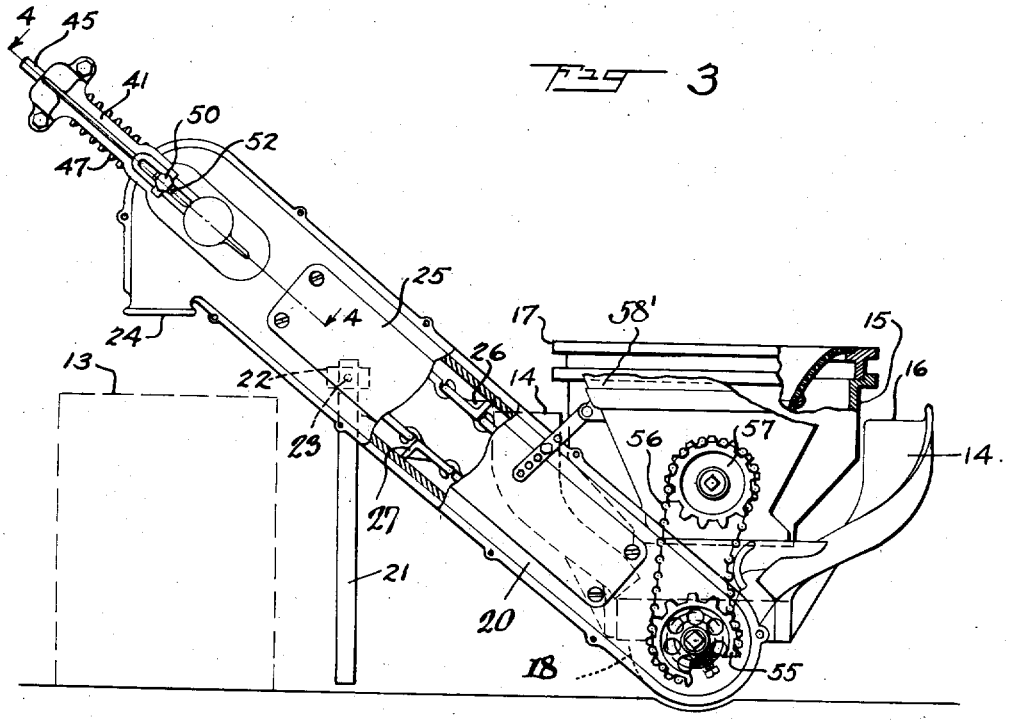
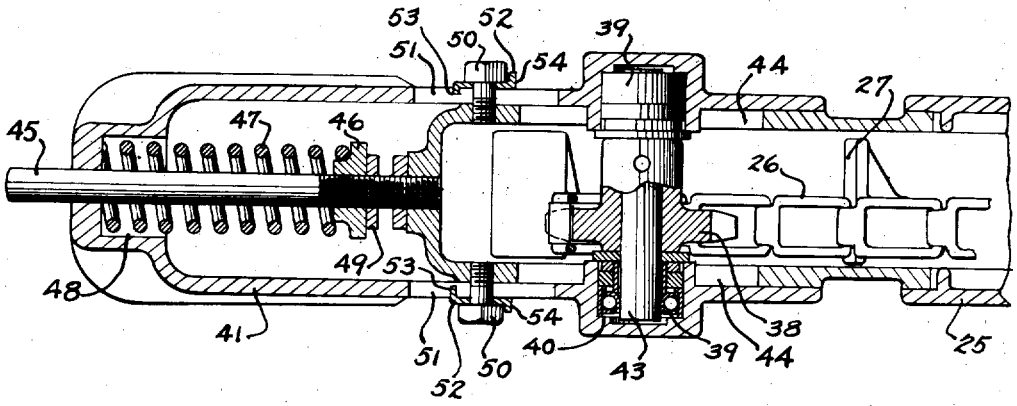
Fig 4
INVENTOR
Cortice H. Hall
BY
Merrell & Clay
ATTORNEYS.

Reissued Mar. 24, 1931

Re. 18,006

UNITED STATES PATENT OFFICE

CORTICE HUNTER HALL, OF GLEN ROCK, NEW JERSEY, ASSIGNOR TO DOMESTIC STOKER COMPANY, OF NEW YORK, N. Y., A CORPORATION OF DELAWARE

ASH-REMOVING DEVICE

Original No. 1,756,025, dated April 29, 1930, Serial No. 42,350, filed July 9, 1925. Application for reissue filed November 26, 1930. Serial No. 498,272.

My invention relates generally to devices for automatically removing ashes from furnaces, and more particularly to a device of this general nature which is especially adapted for use with furnaces or heaters of the household or domestic type.

It is well known that in the operation of household furnaces as ordinarily conducted there is occasion at frequent intervals to manually shovel ashes from the ash pit of the furnace into the receptacle in which they are carried from the premises. Not only is the work of removing ashes in this manner onerous and objectionable in its very nature but the handling of ashes with a shovel produces an undue amount of dust and litter. In addition the cleaning out operation is likely to be forgotten or overlooked with a resulting overfilling and clogging of the furnace ash pit.

A general object of this invention is to eliminate the objectionable work of shoveling ashes in tending a domestic furnace and to provide a device which will operate automatically to remove ashes from a furnace ash pit and discharge them into a suitable receptacle for convenient handling and disposal.

An ash remover designed to fulfil the required conditions should include means for conveying ashes horizontally from the ash pit beneath the furnace to a point outside the wall of the furnace, and additional conveying means for elevating the ashes for discharge into an ash can or other receptacle. An apparatus embodying the above features is described and claimed in the Wightman Patent No. 1,703,130 issued February 26, 1929.

The present invention is of the same general type as that described in the patent referred to but includes improvements and features which increase the efficiency and certainty of operation of the apparatus without attention and insure the maintenance of the ash pit in a condition free from accumulations of ash and clinkers.

The invention includes means adapted to be mounted in the furnace ash pit for directing clinkers falling from the burner into the range of action of the conveyor. While the directing means will function with the more finely divided ashes also, it is particularly desirable that the rough and irregularly shaped clinker masses be directed into the path of the conveyor in order to obviate the possibility of a clogging or bridging action that would prevent the deposit of ashes or clinkers in the conveyor.

The invention also includes means for permitting a yielding action of the conveyor mechanism to prevent clogging or jamming of the parts in handling lumps or clinkers of abnormal size or shape.

Other features of the invention will be hereinafter referred to.

In the drawings, in which a preferred embodiment of the invention has been selected for illustration, Figure 1 is a plan view of an ash removing device embodying the invention.

Figure 3 is a view in front elevation of the parts shown in Figure 1.

Figure 4 is a sectional view on an enlarged scale taken on the line 4—4 of Figure 3.

Figures 1, 2:
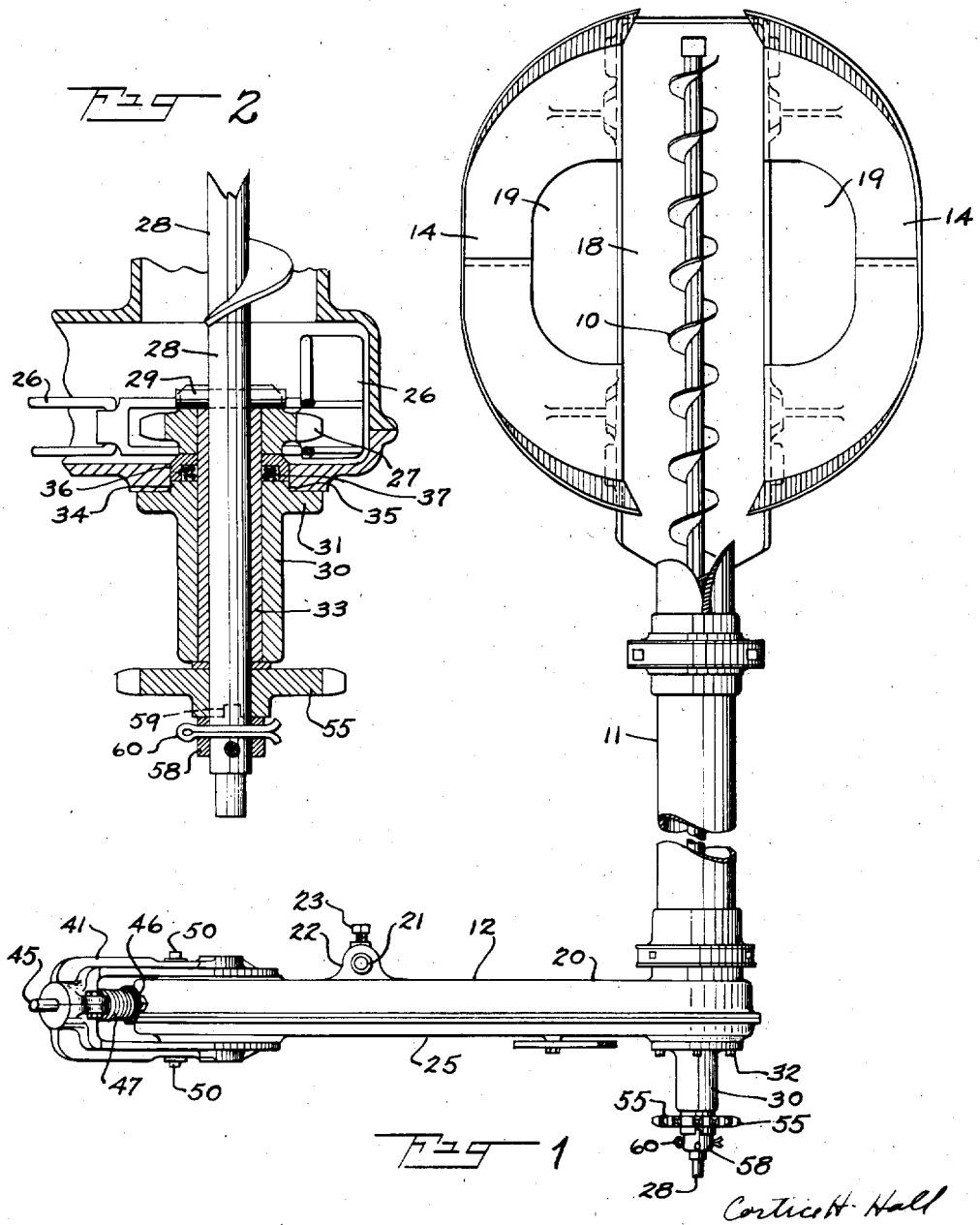
Figure 2 is a view in horizontal section on an enlarged scale of a detail of the device shown in Figure 1.

Referring to the drawings for a more detailed description of the invention, an ash remover for houshold furnaces is shown in Figure 1 of the drawing and includes a screw conveyor 10 operating in a horizontally disposed pipe or conduit 11 which extends from a point within the ash pit chamber to a point outside the outer wall of the furnace. From the outer end of the pipe 11 a conveyor 12 extends in an upwardly inclined direction to convey ashes from the point of discharge of the screw conveyor 10 for delivery into a suitable ash can or other receptacle 13 for final removal and disposal.

The invention includes means adapted to be mounted within the ash pit chamber, which will function to guide or direct clinkers and ashes falling from the fire pot of the furnace into the range of action of the conveyor 10. This means takes the form of a set of inclined directing members 14 which are placed in flanking relation to the fire pot 15 of the furnace which, in the particular installation shown, is of the underfeed type. The directing members 14 extend from elevated points 16 located at oppositely disposed points in the transverse axis of the fire pot downwardly and in curved paths following in general the circular curvature of the outer rim 17 of the fire pot over which ashes and clinkers fall as the fuel is consumed. It will be seen that the directing members 14 are cut away as at 19 to provide space in which to receive the fire pot parts. Finely divided ashes may accumulate on both sides of the channel 18 through the openings 19 but there is no objection to this since the ashes will find their way into the channel when the accumulations have reached a sufficient depth.

The material thus received on the directing members 14 is guided into a trough or channel 18 which is disposed longitudinally of the ash pit chamber beneath the fire pot and the feeding mechanism therefor. The screw conveyor 10 extends longitudinally of the channel 18 and thereby occupies a position wherein ashes directed into the channel are engaged by the helical flange or screw of the conveyor and impelled outwardly through the conduit 11, as will be clear. The conduit 11 is provided with a longitudinally extending notch in its inner or receiving edge formed by converging curved surfaces as illustrated in Figure 1. These surfaces act to crush the clinkers forced into the conduit and thereby reduce them to a size which may be handled in the removing and elevating conveyors.

The elevator or lifting conveyor 12 includes a casing 20 whose lower end is coincident with the exterior terminus of the screw conveyor conduit 11 and rises in an inclined position in which it is supported by an adjustable standard or leg 21 held in place in a bracket 22 by means of a set screw 23. The elevator conveyor casing 20 is provided with a downwardly opening discharge outlet 24 located at a convenient height to discharge into the removable receptacle 13.

Within the casing 20 which is conveniently formed in two sections so that the forward wall 25 of the casing may be completely removed for access to the working parts, a conveyor 26 of the chain or link type is mounted for operation. The conveyor chain 26 includes flights or ash moving members 27 preferably formed integrally with the links in the chain 26. In the form of the invention shown the flights 27 extend laterally to one side of the chain to thereby provide a wider and more effective working path than is provided by the width of the chain itself.

The conveyor chain 26 passes around a sprocket wheel 27′ at the lower end of its course, the sprocket wheel being rotatable with the shaft 28 of the screw conveyor 10 through a keyed connection 29 therewith. With this construction it will be seen that the shaft of the horizontal conveyor 10 serves as a driving member for the elevating conveyor 26.

In order to protect the journaled parts associated with the sprocket wheel 27′ and conveyor shaft 28 from the action of ashes and dust a special bearing construction is provided. This construction includes an elongated hub member 30 having a flange 31 at its inner end which is attached to the forward face of the conveyor casing cover 25 by means of lag screws 32 or the like. Within the elongated bearing provided by the hub member 30 is journaled a sleeve member 33 which is immovably associated with the shaft 28 and the sprocket gear 27′ by means of the key 29. The inner end of the hub member 30 is provided with an axial extension 34 which is adapted to rotate within a circular opening 35 formed in the cover member 25. Also received in the circular opening 35 in the cover member 25 is a cup-shaped housing or protecting member 36, the open or recessed side of the cup-shaped member being filled with an oil-soaked felt washer or the like 37. With this construction a bearing is provided in which the journaled parts are protected from the destructive effects of ashes and dust.

The upper end of the elevating conveyor 26 is provided with a sprocket wheel 38 around which the conveyor chain is passed. The shaft 43 of the sprocket gear 38 is provided with ball bearing devices 39 mounted in cup-shaped recesses 40 in a U-shaped frame member 41 which is mounted in flanking relation to the opposite lateral faces of the upper end of the casing 20.

In order to provide for a resilient or yielding action of the elevating conveyor 26 in the event that a clinker becomes jammed or wedged in the elevating apparatus, the U-shaped frame member 41 which carries the shaft 43 of the sprocket gear 38 is arranged to slide longitudinally of the casing 20. To effect this the opposite sides of the casing 20 are provided with slots 44 through which the cup-shaped members 40 housing the bearings for the sprocket shaft 43 extend for movement longitudinally of the slots 44. The outer or upper extremity of the conveyor casing 20 is provided with a pin or stud 45 on which is mounted an abutment member 46 forming a seat for a compression spring 47, the outer end of which is received in a recess 48 formed in the base portion of the U-shaped framework 41. With the structure thus described it will be seen that the spring 47 acts to force or tend to force the frame member 41 outwardly while permitting yielding movement of the sprocket wheel 38 inwardly or downwardly in the event of a jam or obstruction in the operating parts.

The tension of the spring 47 may be adjusted as desired by rotating the abutment member 46 on the pin 45 and locking it in adjusted position by means of the lock nut 49. In order to guide the frame member 41 and properly direct its movement, guide screws 50 are provided which project through slots 51 formed in the frame 41 and into the sides of the casing 20. Specially formed washers 52 are provided which have terminal projections 53 which enter and move in the guide slots 51. The oppositely disposed upstanding portions 54 engage flat faces of the heads of the screws 50 to prevent loosening or turning of the screws in their seats.

Since the elevating conveyor is driven from its lower end and resiliently supported from its upper end, an obstruction between the elevating flights or carrier elements 27 and the casing surrounding the elevator may in many cases be passed by the pivoting of the flight or carrier element, which is rigidly fixed to the chain 26, around the obstruction so as to change the angle of its contact with the latter; the pivoting of the flight or carrier element being permitted by the yielding of the upper support for the elevator chain. Also, the force of the spring, which is compressed when an elevator of this type strikes an obstruction, will be added to the pulling force of the chain and the total force will in many cases be sufficient to crush the obstruction. Where the obstruction is so great that it can not be avoided or crushed, the frangible connection will prevent the breakage of difficultly replaceable parts of the mechanism.

In order to operate the device described a sprocket wheel 55 is provided over which a suitable sprocket chain connection such as is shown at 56 in Figure 1 is passed to apply power to the operating parts. The sprocket wheel 56 may conveniently receive power from a sprocket wheel 57 forming part of suitable fuel feeding or stoking apparatus in which the hopper member 58′ is included.

In order to guard against the breakage of the parts when an obstruction or jamming action of either conveyor takes place, a frangible member is provided which will shear or give way to relieve the stress or strain developed under such conditions. The means chosen for the purpose takes the form of a collar member 58 having a toothed or clutched connection as at 59 with the hub flange on the sprocket wheel 55. The collar 58 is attached to the shaft 28 to convey rotative movement thereto by means of a cotter pin or pins 60 or equivalent key members which will shear under an undue stress applied to the driving gear 55. With this construction it is a simple matter to remove the collar 58 and replace the frangible or yieldable member 60 without the necessity for disassembling the remainder of the driving structure.

What I claim is:

1. In an ash remover for furnaces the combination with a fire pot of the underfeed type of a horizontally arranged screw conveyor adapted to extend into the furnace ash pit beneath the fire pot to remove ashes therefrom, helically inclined members arranged to direct ashes falling from the rim of the fire pot into the conveyor, a casing in which the conveyor operates, an elongated bearing member at the outer end of the casing through which the conveyor shaft projects, a sprocket wheel rotatably mounted on the shaft adjacent the outer end of the bearing member, a sleeve member removably mounted on the shaft and having a toothed engagement with the hub of the sprocket wheel whereby to be rotated thereby, and a cotter pin connecting the sleeve to the shaft.

2. In a furnace of the underfeed type, the combination with a substantially circular fire pot with an ash pit therebeneath of a horizontally arranged screw conveyor extending into the ash pit to withdraw ashes and clinkers therefrom, a tubular casing for the conveyor open along its upper wall in the portion extending into the ash pit, said conveyor extending across the ash pit chamber substantially at the central part thereof and semicircular directing members positioned beneath the rim of the fire pot to receive ashes falling therefrom and having apex points located in flanking relation to the conveyor, said directing members being inclined downwardly from the apex points to discharge into the conveyor casing ashes and clinkers received from the circular rim of the fire pot.

3. In a furnace of the underfeed type, the combination with a fire pot having a circumscribing rim from the outer edge of which ashes are discharged with an ash pit therebeneath, a horizontally arranged conveyor extending into the furnace ash pit to withdraw ashes therefrom, helically inclined members mounted in the ash pit beneath the rim of the fire pot to receive ashes falling therefrom and to direct said ashes into the range of action of the conveyor, together with means for receiving ashes from the horizontally arranged conveyor and elevating them for discharge into a receptacle.

4. In an ash remover for furnaces of the underfeed type, a horizontally arranged conveyor adapted to extend across the floor of the furnace ash pit beneath the fire pot and helically inclined ash directing members arranged to receive ashes falling from the upper and outer edge of the fire pot and to deflect the ashes into the range of action of the conveyor.

5. In a furnace of the underfeed type, the combination with a fire pot of an ash pit therebeneath, a horizontally arranged conveyor extending across the floor of the furnace ash pit beneath the fire pot, a trough-shaped member in which said conveyor operates, helically inclined wing members adapted to be removably attached to the sides of the trough-shaped members, said wing members being beneath the outer edge of the fire pot to receive ashes falling from the rim of the fire pot and at opposite sides thereof whereby ashes falling from the outer edge of the fire pot will be deflected into the range of action of the conveyor.

6. In a furnace of the underfeed type, the combination with a fire pot of an ash pit therebeneath, a horizontally arranged screw conveyor adapted to extend into the furnace ash pit beneath the fire pot to remove ashes dropped from the rim of the fire pot, helically inclined members for directing ashes falling from the rim of the fire pot into the range of action of the conveyor, a sprocket wheel on the conveyor shaft, a sprocket chain through which power is supplied to the sprocket wheel, a sleeve on the shaft having a toothed engagement with the hub of the sprocket wheel shaft and a frangible connection between the sleeve and the shaft whereby the frangible connection will give way and permit the sleeve and the sprocket wheel to turn freely on the shaft in the event that the operation of the conveyor is obstructed.

7. An ash remover for furnaces of the underfeed type arranged to discharge ashes over the outer edge of the fire rim comprising, in combination a horizontally arranged conveyor adapted to extend into the furnace ash pit below the rim of the fire pot to withdraw ashes and clinkers therefrom and means shaped to follow the contour of the outer rim of the fire pot to be mounted in the ash pit beneath and adjacent the rim of the fire pot to direct ashes and clinkers falling from the fire pot into the range of action of the conveyor.

8. An ash remover for furnaces of the underfeed type arranged to discharge ashes over the outer edge of the fire pot rim comprising, in combination a horizontally arranged conveyor adapted to extend into the furnace ash pit below the rim of the fire pot to withdraw ashes and clinkers therefrom and inclined directing members arranged to be mounted in the ash pit on opposite sides of the rim of the fire pot and following the contour of the outer edge thereof to deflect ashes and clinkers falling from the fire pot into the conveyor.

9. An ash remover for furnaces of the underfeed type having a circular edge and an ash pit therebeneath comprising a horizontally arranged conveyor adapted to extend into and across the furnace ash pit substantially at the central part thereof and inclined directing approximately semi-circular members shaped to follow the contour of the outer edge of the fire pot and adapted to be mounted in the ash pit on opposite sides of the fire pot and sloping inwardly to deflect ashes and clinkers falling from the fire pot into the conveyor.

10. An ash remover for furnaces of the underfeed type having a circular fire pot arranged to discharge ashes over the outer edge thereof comprising a horizontally arranged conveyor adapted to extend into the furnace ash pit and comprising a trough and a conveyor screw operating therein and inclined directing approximately semi-circular members shaped to follow the contour of the outer edge of the fire pot and sloping inwardly and downwardly to direct ashes and clinkers falling from the rim of the fire pot downwardly and inwardly into said trough.

11. In an ash removing device for a furnace, a conveyor adapted to remove ashes from the furnace ash pit, means for positively driving said conveyor, and an ash elevating device of the endless chain conveyor type arranged to receive ashes from the outer end portion of the ash removing conveyor, said ash elevating device having elevating carriers fixed to its actuating chain so as to resist yielding downwardly under a load, said chain being driven from its lower end by the said means for driving the ash removing conveyor, and having its upper end resiliently supported so as to permit it to yield longitudinally.

12. In an ash removing device for a furnace, a screw conveyor adapted to remove ashes from the furnace pit, and an ash elevating device of the endless chain conveyor type arranged to receive ashes from the outer end portion of the screw conveyor, said ash elevating device having elevating carriers fixed to its actuating chain so as to resist yielding downwardly under a load, said chain being driven at its lower end from the screw conveyor and having its upper end resiliently supported so as to permit it to yield longitudinally.

13. In an ash removing device for a furnace of the underfeed type, a fire pot, a conduit positioned to conduct ashes away from said fire pot, directing plates extending beyond the edge of said fire pot and positioned to direct ashes falling over the edge of the fire pot into the said conduit, a screw conveyor positioned in said conduit and adapted to move the ashes through it, an ash elevating device of the endless chain type arranged to receive ashes from the outer end portion of said ash conveyor, said ash elevating means being driven at its lower end from the ash conveyor and having its upper end resiliently supported so as to permit it to yield longitudinally.

14. In an ash removing device for a furnace, a screw conveyor adapted to remove ashes from the furnace ash pit, means for positively driving said screw conveyor, and an ash elevating device of the endless chain conveyor type arranged to receive ashes from the outer end portion of the screw conveyor, said ash elevating device including elevating carriers fixed to a chain so as to resist downward movement of the carriers under a load, a lower chain sprocket wheel driven by the means for driving the screw conveyor and an upper sprocket wheel for carrying the chain at the upper end of the elevator, said upper sprocket wheel being resiliently supported so as to permit it to yield longitudinally of the chain.

15. In an ash removing device for a furnace, a substantially horizontal conduit adapted to remove ashes from the furnace pit, a screw conveyor in said conduit for moving the ashes through it, means for operating said conveyor, an ash elevating device of the endless chain conveyor type arranged to receive ashes from the outer end portion of the horizontal conduit and extending at right angles and at an upward inclination from the horizontal ash conveyor, said ash elevator having elevating carriers fixed to its actuating chain so as to resist yielding downwardly under a load, said chain being driven through a sprocket wheel as its lower end from the screw conveyor shaft and having a sprocket wheel for carrying the chain at the upper end of the elevator resiliently mounted so as to permit it to yield longitudinally of the chain.

16. In an ash removing device for a furnace of the underfeed type, a fire pot, a conduit positioned to receive ashes and clinkers at one end and to conduct the same away from the fire pot, said conduit having a tapering notch in its receiving edge extending longitudinally of the conduit, an ash guide for directing ashes and clinkers to the receiving end of the conduit, and means for moving ashes and clinkers into and through the said conduit.

17. In an ash removing device for a furnace, a conveyor adapted to remove ashes from the furnace ash pit, means for driving said conveyor, an ash elevating device of the endless chain conveyor type arranged to receive ashes from the outer end portion of the ash removing conveyor, said ash elevating device having elevating carriers fixed to its actuating chain so as to resist yielding downwardly under a load, said chain being driven from its lower end by the means for driving the ash removing conveyor and having its upper end resiliently supported so as to permit it to yield longitudinally, and additional means for relieving the mechanism in the event of an overload on the ash remover or elevating mechanism.

18. A conveyor adapted to remove ashes from a furnace, comprising a substantially horizontal conveyor, means for driving said conveyor, and an elevating conveyor positioned within a casing and arranged to receive ashes from the outer end portion of said horizontal conveyor and comprising an actuator of the endless conveyor type having elevating carriers fixed to it so as to resist movement of the carrier relative to the actuator when a load is applied to the carrier, said elevating carrier being driven from its lower end and having its upper end resiliently supported so as to permit it to yield longitudinally.

In testimony whereof, I have signed my name to this specification this third day of November, 1930.

CORTICE HUNTER HALL.